(12) United States Patent
Koehler et al.

(10) Patent No.: US 8,873,823 B2
(45) Date of Patent: Oct. 28, 2014

(54) MOTION COMPENSATION WITH TISSUE DENSITY RETENTION

(75) Inventors: Thomas Koehler, Norderstedt (DE); Tobias Klinder, Uelzen (DE); Sven Kabus, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 321 days.

(21) Appl. No.: 13/510,153

(22) PCT Filed: Nov. 18, 2010

(86) PCT No.: PCT/IB2010/055266
§ 371 (c)(1),
(2), (4) Date: May 16, 2012

(87) PCT Pub. No.: WO2011/073818
PCT Pub. Date: Jun. 23, 2011

(65) Prior Publication Data
US 2012/0237097 A1 Sep. 20, 2012

Related U.S. Application Data

(60) Provisional application No. 61/286,410, filed on Dec. 15, 2009.

(51) Int. Cl.
*G06K 9/00* (2006.01)
*G06T 11/00* (2006.01)

(52) U.S. Cl.
CPC ......... *G06T 11/008* (2013.01); *G06T 2211/412* (2013.01)
USPC ........................................ 382/131

(58) Field of Classification Search
CPC ... G06T 11/003; G06T 11/006; G06T 11/008; G06T 2207/10072; G06T 2207/10076; G06T 2211/40; G06T 2211/412
USPC ........................ 382/128, 131, 154; 378/4, 9
See application file for complete search history.

(56) References Cited

U.S. PATENT DOCUMENTS

| | | | |
|---|---|---|---|
| 5,245,538 A | 9/1993 | Lis | 364/413.13 |
| 7,440,628 B2 | 10/2008 | Chefd'hotel | 382/236 |
| 7,742,564 B2 | 6/2010 | Parham et al. | 378/71 |
| 2006/0050845 A1 | 3/2006 | Juni | 378/51 |
| 2007/0197907 A1 | 8/2007 | Bruder et al. | 600/425 |

(Continued)

FOREIGN PATENT DOCUMENTS

| | | | | |
|---|---|---|---|---|
| CN | 101405596 A | 4/2009 | | G01N 23/04 |
| EP | 1426903 A2 | 6/2004 | | G06T 11/00 |
| FR | 2614163 A1 | 10/1988 | | H04N 3/00 |
| WO | 2007099525 A2 | 9/2007 | | |

OTHER PUBLICATIONS

Guerrero, T., et al.; Dynamic ventilation imaging from four-dimensional computed tomography; 2006; Phys. Med. Biol.; 51:777-791.

(Continued)

*Primary Examiner* — Andrew W Johns

(57) ABSTRACT

A method includes reconstructing the projection data based on a reconstruction algorithm that compensates for both motion and tissue density changes of the moving organ across different motion phases, thereby generating motion and density compensated image data. A data compensator includes a reconstructor that reconstructs motion compensated image data based on an reconstruction algorithm that compensates for tissue density changes in a moving object.

25 Claims, 3 Drawing Sheets

(56) References Cited

U.S. PATENT DOCUMENTS

| | | | |
|---|---|---|---|
| 2009/0141935 A1 | 6/2009 | Grass et al. | 382/103 |
| 2009/0174812 A1 | 7/2009 | Hong | 348/441 |
| 2009/0310825 A1 | 12/2009 | Bontus et al. | 382/107 |

OTHER PUBLICATIONS

Lee, S. L. A., et al.; From Lung Images to Lung Models: A Review; 2008; IEEE World Congress on Computational Intelligence; pp. 2377-2383.

Marchette, D. J., et al.; An Analysis of Local Feature Extraction in Digital Mammography; 1997; Pattern Recognition; 30(9)1547-1554.

Murphy, K., et al.; Obstructive pulmonary function: Patient classification using 3D registration of inspiration and expiration CT images; 2009; Second International Workshop on Pulmonary Image Processing; MICCAI; pp. 37-47.

Webb, S.; Non-Standard CT Scanners: Their Role in Radiotherapy; 1990; International Journal of Radiation: Oncology Biology Physics; 19(6)1589-1607.

Weisstein, E. W.; Divergence; 2007; Mathworld; http://mathworld.wolfram.com/divergence.html.

US 8,873,823 B2

MOTION COMPENSATION WITH TISSUE DENSITY RETENTION

CROSS REFERENCE TO RELATED APPLICATIONS

This application claims the benefit of U.S. provisional application serial no. 61/286,410 filed Dec. 15, 2009, which is incorporated herein by reference.

DESCRIPTION

The following generally relates to motion compensation with tissue density retention and is described herein in connection with computer tomography (CT). However, it is also amenable to other imaging applications.

A computed tomography (CT) scanner generally includes an x-ray tube mounted on a rotatable gantry opposite a detector array including one or more rows of detector pixels. The x-ray tube rotates around an examination region located between the x-ray tube and the detector array and emits radiation that traverses the examination region and an object or subject disposed therein. The detector array detects radiation that traverses the examination region and generates projection data indicative of the examination region and the object or subject disposed therein. A reconstructor processes the projection data and generates volumetric image data indicative of the examination region and the object or subject disposed therein. The volumetric image data can be processed to generate one or more images that include the scanned portion of the object or subject.

In some instances, the scanned portion of the object or subject includes a moving structure, such as the heart or lung, or anatomy affected by the movement of a moving structure. In such instance, motion artifacts may be introduced into the projection data and hence the image data and images generated therefrom. Motion compensated reconstruction techniques have been used to compensate for motion. With one approach, a motion field is estimated based on a 4D-CT (e.g., by propagation of a surface) and used during backprojection to adjust a position of an object point to be reconstructed to the actual point in time corresponding to the projection prior to backprojection. This approach has resulted in images in which the morphology of the lung is accurately recovered and the signal to noise ratio (SNR) is increased.

Unfortunately, such motion compensation also combines intensity information from different motion states. Thus, while this approach generally provides images with improved image quality (e.g., reduced motion and improved SNR), similar tissue (e.g., lung tissue) in the images corresponding to different motion states that had different tissue density in the pre-motion compensated images will now have the same average density in the motion compensated images. By way of example, lung tissue generally has a lower density in an inhale state relative to an exhale state. With conventional motion compensation approaches, lung tissue in the motion corrected images may have the same density regardless of the respiratory state (inhale or exhale state).

Aspects of the present application address the above-referenced matters and others.

In one aspect, a method includes reconstructing the projection data based on a reconstruction algorithm that compensates for both motion and tissue density changes of the moving organ across different motion phases, thereby generating motion and density compensated image data.

In another aspect, a data compensator includes a reconstructor that reconstructs motion compensated image data based on an reconstruction algorithm that compensates for tissue density changes in a moving object in projection data.

In another aspect, a computer readable storage medium containing instructions which, when executed by a computer, cause the computer to perform the act of: reconstructing projection data based on a supplemented motion vector field that compensates for both motion and tissue density changes of a moving organ across different motion phases.

The invention may take form in various components and arrangements of components, and in various steps and arrangements of steps. The drawings are only for purposes of illustrating the preferred embodiments and are not to be construed as limiting the invention.

Figure 1:
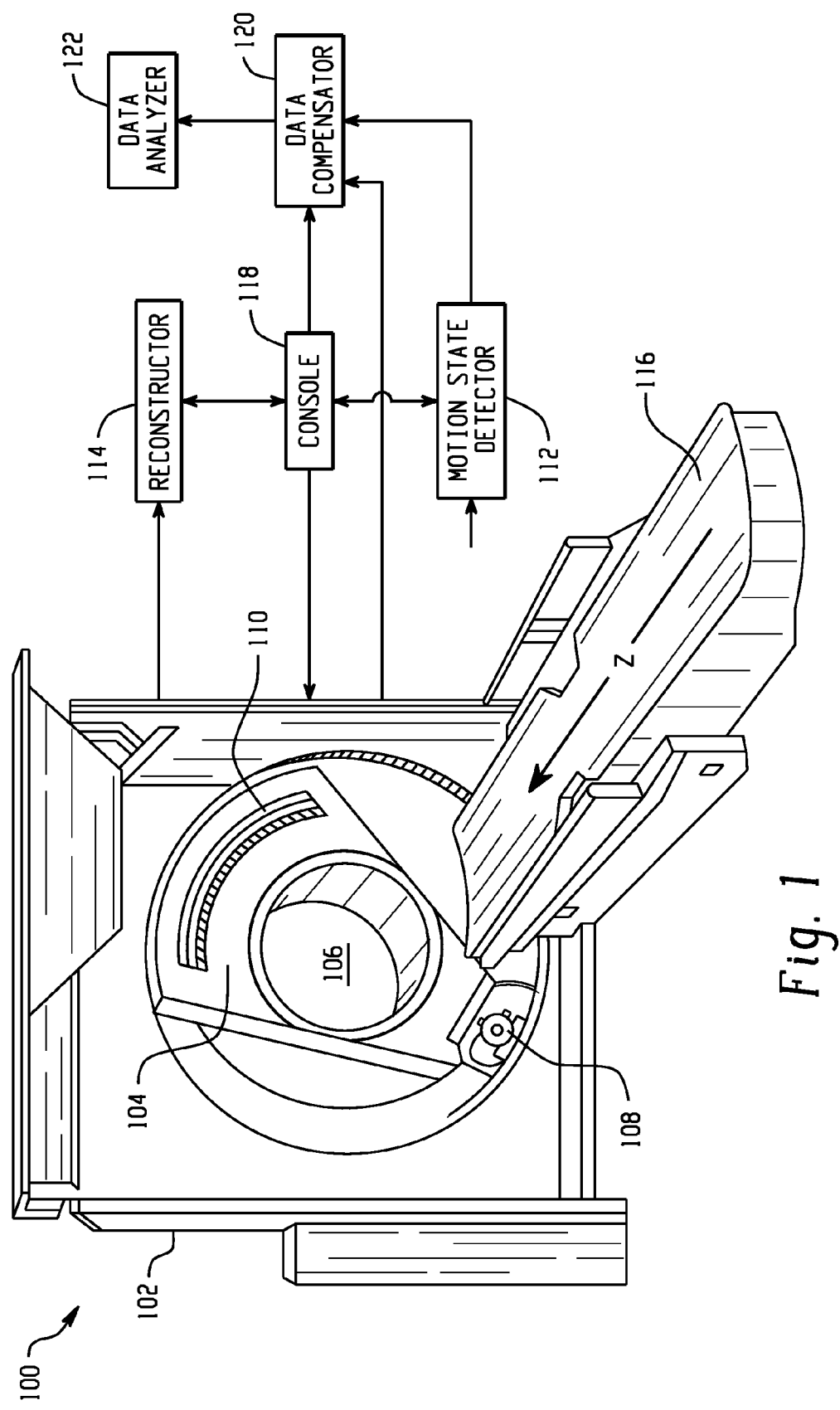
FIG. 1 illustrates an example imaging system in connection with a motion corrector.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis.

A radiation source 108, such as an x-ray tube, is supported by the rotating gantry 104 and rotates with the rotating gantry 104, and emits radiation that traverses the examination region 106. A source collimator collimates the emitted radiation to form a generally fan or cone shaped radiation that traverses the examination region 106. A radiation sensitive detector array 110 detects radiation emitted by the radiation source 108 that traverses the examination region 106 and generates projection data indicative of the detected radiation.

A motion state detector 112 detects motion of moving tissue of a patient during an imaging acquisition and generates a motion signal indicative thereof. Examples of moving tissue include lung tissue, heart tissue, and/or tissue of other moving organs of a human or animal patient. The motion state detector 112 may include a respiratory belt, light emitting landmarks, an ECG monitor, etc. that facilitates detecting the motion.

A reconstructor 114 reconstructs projection data (including the compensated projection data described below) and generates volumetric image data indicative of the examination region 106. The reconstructor 114 can employ various reconstruction algorithms such as a filtered backprojection algorithm, cone beam algorithm, an iterative algorithm, etc. An image processor can generate one or more images based on the volumetric image data. The one or more images can be displayed, filmed, further processed, etc.

A support 116, such as a couch, supports the object or subject in the examination region 106. The support 116 is movable along the z-axis in coordination with the rotation of the rotating gantry 104 to facilitate helical, axial, or other desired scanning trajectories.

A general purpose computing system serves as an operator console 118, which includes human readable output devices such as a display and/or printer and input devices such as a keyboard and/or mouse. Software resident on the console 118 allows the operator to control the operation of the system 100, for example, by allowing the operator to select a motion compensation protocol, initiate scanning, etc.

A data compensator 120 compensates projection data for motion while retaining tissue density difference for a given reference motion state. As described in greater detail below, the motion compensator 120 compensates for motion based on a motion vector and retains tissue density by scaling the filtered projection data in accordance with the change in volume of the tissue. Where the tissue is lung tissue, this may include scaling the filtered projection data to take into account the difference in tissue density between the respiratory inhale and exhale states. Generally, lung tissue has a lower density in an inhalation phase and a higher tissue density in an exhalation phase.

A data analyzer 122 analyzes the reconstructed compensated data and quantifies tissue density differences in similar tissue for different motion states. By way of example, the data analyzer 122 can quantify ventilation of lung tissue, and the resulting quantification can be used to detect a condition such as emphysema or the like. With emphysema, lung tissue density that would otherwise change between inhalation and exhalation may not change at all. Thus, an absence of a change in tissue density across these motion phases may indicate a presence of emphysema. Other conditions that may likewise affect tissue density include fibrosis, inflammation, etc. With radiation therapy planning, the quantification can be used to distinguish healthy and non-healthy tissue, which may impact the dose delivered to the particular tissue, with dose less of a concern with diseased tissue.

It is to be appreciated that the data compensator 120 discussed above is part of a computing system that includes one or more processors that executes one or more computer readable instructions encoded in one or more computer readable storage mediums. The computing system can be part of (or integrated with) the system 100 or separate from the system 100 and located local to (as shown) or remote from the system 100.

Figure 2:
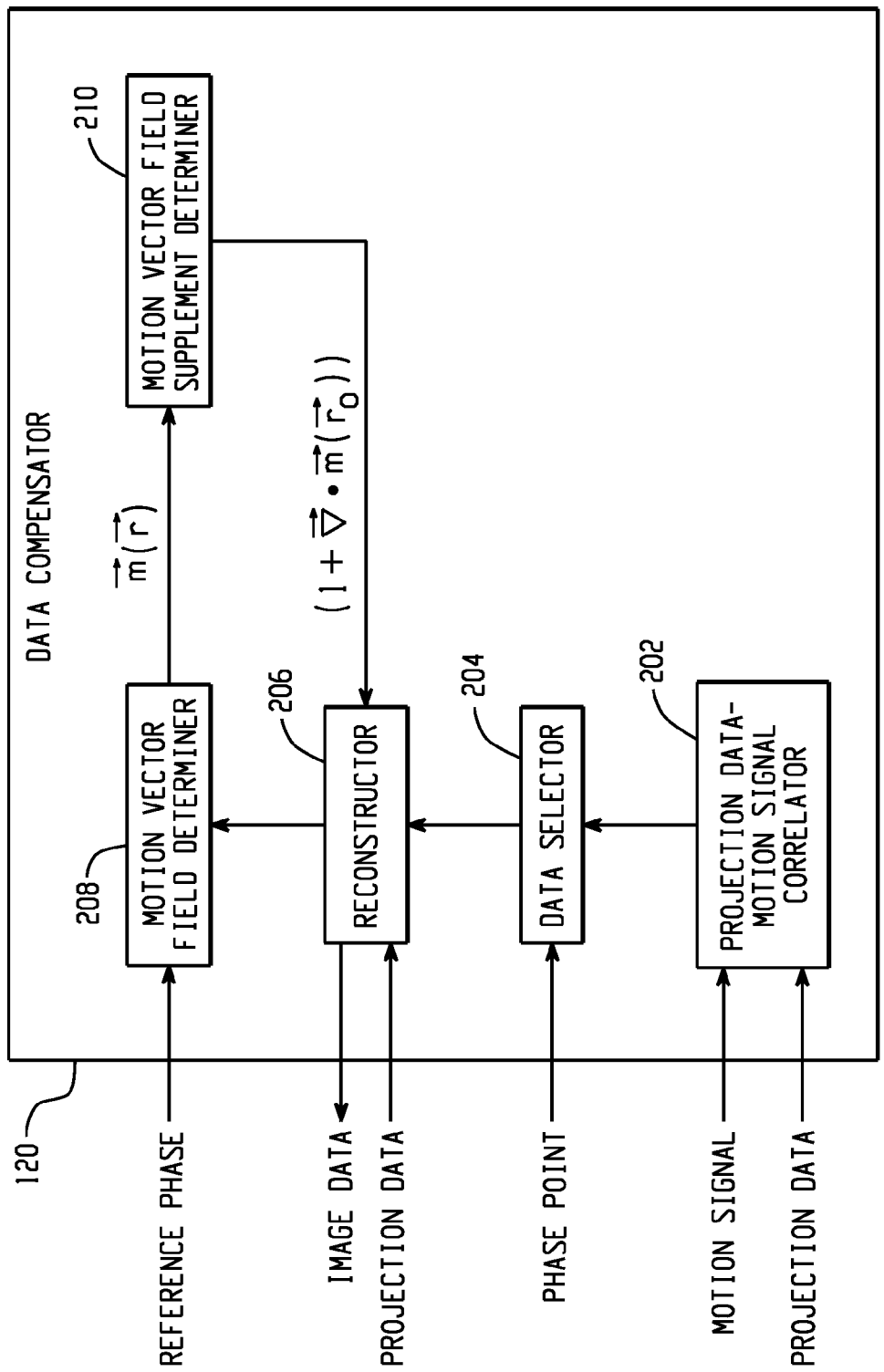
FIG. 2 illustrates an example motion corrector.

FIG. 2 illustrates an example data compensator 120.

A projection data—motion signal correlator 202 receives projection data generated by the imaging system 100 and the motion signal generated by the motion state detector 112 and correlates the projection data and the motion signal. As such, project data corresponding to a particular motion phase can be identified.

A data selector 204 selects data from the projection data for reconstruction. In this embodiment, the data selector 204 receives a signal indicative of a desired phase point and selects projection data for a plurality of different motions phases around the desired motion phase. The signal can be based on user input, the selected imaging protocol, and/or otherwise.

A reconstructor 206 reconstructs the selected projection data, generating image data for the different motions phases around the motion phase point. Similar to the reconstructor 114, the reconstructor 206 can employ various reconstruction algorithms such as a filtered backprojection algorithm, cone beam algorithm, an iterative algorithm, etc. An example of a suitable reconstruction is a 4D gated reconstruction. The resulting image data provides a series of images around the motion phase. With a cardiac scan, the images are related to the cardiac cycle, with a lung scan, the images are related to the respiratory cycle, etc. Alternatively, the reconstructor 114 or other reconstructor can be used.

A motion vector field determiner 208 determines a motion vector field based on the reconstructed image data and a reference (or reconstruction) motion phase. The motion vector field includes the displacement between voxels in the image data of the reference phase and voxels in the image data of the other phases. Motion vector fields for motion phases outside of the reconstructed motion phases can be derived via interpolation or other technique.

For this example, the motion vector is represented by $\vec{m}(\vec{r})$, where $\vec{m}$, for a given $\vec{r}$, represents a voxel position in the reference motion phase, provides a displacement (including direction) for the voxel with respect to a different motion phase. Suitable units include millimeters (mm) or other distance units.

An example of determining a motion field vector for a cardiac application is described in U.S. patent application Ser. No. 12/093,458, publication number US 2009/0141935 A1, filed on Nov. 14, 2006, and entitle "Motion Compensated CT Reconstruction of High Contrast Objects," the entirety of which is incorporated herein by reference.

The motion vector field can be used during reconstruction to displace a voxel to a correct position for the particular reconstruction motion phase prior to backprojecting the voxel. As a result, motion blurring can be reduced, improving the signal-to-noise ratio (SNR) and thus sharpening the image data and improving image quality.

However, the method described in 2009/0141935 A1 does not correct for intensity, or does not take into account tissue density difference between motion phases due to the changing volume of the tissue and thus does not change the density of the of displaced voxel. As such, for tissue like lung tissue, which changes in density between inhalation (expansion) and exhalation (contraction) phases, compensating for motion with the above motion vector field results sharper images, but a loss of differences in tissue density.

A motion vector field supplement determiner 210 determines a supplement to the motion vector field by deriving information about tissue density difference between motion phases due to a changing volume when displacing voxels. In one instance, the change in volume is taken into account through a divergence $\vec{\nabla}$ of the motion field, and the supplement is represented by the scalar field $(1+\vec{\nabla}\cdot\vec{m}(\vec{r}_0))$, which represents a local scaling of the volume that is subjected to the motion vector field.

In one instance, this scalar ranges from just above zero to a value proportional to the increase in the volume. The term $\vec{\nabla}\cdot\vec{m}(\vec{r}_0)$ is greater than negative one (−1), with a negative value representing tissue contraction, a value of zero representing tissue volume preservation, and a positive value representing tissue expansion. By way of example, if the volume contracts by 50%, the Equation 2 renders a value of 0.5, and if the volume doubles, the Equation 2 renders a value of 2.0.

Alternatively, the determinant of the Jacobian of the motion vector field can be used to scale the motion vector field.

The reconstructor 206 (or the reconstructor 114 or other reconstructor) employs a filtered backprojection reconstruction algorithm and reconstructs the projection data based on the motion vector field and the supplement. For the reconstruction, a size of a volume element $V(\vec{r}_0)$ that has the volume $V_0(\vec{r}_0)$ in the reference motion phase is approximated based on Equation 1:

$$V(\vec{r}_0)=V_0(\vec{r}_0)(1+\vec{\nabla}\cdot\vec{m}(\vec{r}_0)). \qquad \text{Equation 1}$$

By reconstructing the full set of projection data based on the motion vector field and the supplement, the reconstruction compensates for motion and takes into account tissue density changes across motion states due to a volume change, thereby allowing for retention of any differences in tissue density across motion states. Without the above described supplemental scaling, the tissue density is essentially averaged across the motion states, and any change in tissue density is lost.

In one instance, the above represents a heuristic adjustment of the local dc value of the filtered projections that is approximately valid for the compressible part of the lung, which may facilitate a more realistic density measurement of the lung tissue.

Vessels and/or other structure can be excluded from the tissue density correction via segmenting the vessels and/or other structure prior to applying the correction vector to the remaining part of the volume.

Figure 3:
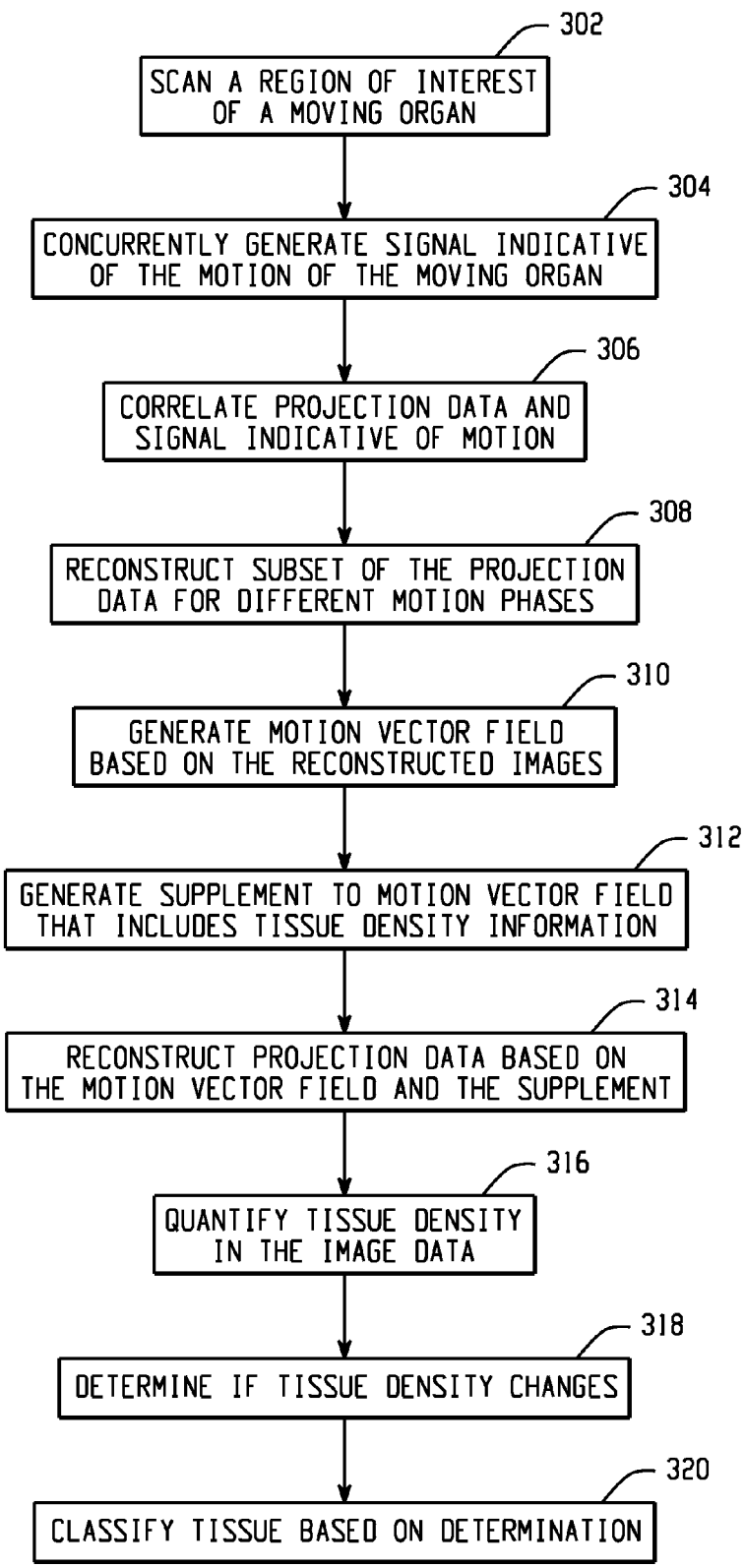
FIG. 3 illustrates an example method for motion compensation with density retention.

FIG. 3 illustrates a method for performing motion compensation and retaining tissue density differences across motion phases.

At 302, a region of a patient that includes moving tissue of interest such as the lung, heart, etc. is scanned and project data indicative thereof is generated;

At 304, a motion signal describing the motion of the moving tissue of interest during the scan is generated. As discussed above, the motion signal is detected concurrently with the scan.

At 306, the projection data and the motion signal are correlated.

At 308, a subset of projection data for different motion states about a phase point is reconstructed, generating image data for the different motions phases. The image data can be based on a 4D-gated reconstruction or other reconstruction.

At 310, a motion vector field is generated based on the image data for the motion phases and an identified reference motion phase. The motion vector field can be generated based on a model adaption, surface propagation, registration, and/or other technique, and provides information related to the displacement of a voxel between motion phases.

At 312, a supplement to the motion vector field is generated and includes information related to tissue density changes across the motion states due to the changing volume of the tissue as described herein, for example, with a divergence of the motion vector field.

At 314, the projection data is reconstructed using the motion vector field and the supplement respectively to displace and density scale voxels. As discussed herein, for each reconstructed voxel, a displacement for moving the voxel to the reconstruction motion phase and a scaling of the filtered projection data to retain density information is applied.

At 316, the tissue density for the tissue in the compensated image data is quantified.

At 318, the quantification is used to determine whether the tissue density changes across motion states.

At 320, the tissue is classified based on the determination. For example, where normal healthy tissue has a tissue density that changes across motion phases due to a changing volume of the tissue, no change in the tissue density across the motion phases may indicate that the tissue is not healthy.

The above may be implemented by way of computer readable instructions, which when executed by a computer processor(s), cause the processor(s) to carry out the described acts. In such a case, the instructions are stored in a computer readable storage medium associated with or otherwise accessible to the relevant computer.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method for processing projection data, from an imaging system, of a moving organ, comprising:
reconstructing the projection data based on a reconstruction algorithm that compensates for both motion and tissue density changes of the moving organ across different motion phases, thereby generating motion and density compensated image data.

2. The method of claim 1, wherein the reconstruction algorithm is based on a supplemented motion vector field.

3. The method of claim 2, further comprising:
obtaining a motion vector field, which provides information related to a displacement of a voxel in one motion phase to a position in a reconstruction motion phase; and
generating the supplemented motion vector field by supplementing the motion vector field with a parameter indicative of a change in a volume of the organ between the different motion phases.

4. The method of claim 3, wherein the change in the volume is proportional to a change in tissue density.

5. The method of claim 4, wherein at least one of a negative divergence indicates a contraction of the volume and an increase in tissue density, a positive divergence indicates an expansion of the volume and a decrease in tissue density, or a divergence of about zero indicates preservation of the volume and tissue density.

6. The method of claim 3, wherein the parameter is a divergence of the motion vector field.

7. The method of claim 3, wherein the parameter is based on a Jacobian of the motion vector field.

8. The method of claim 3, wherein the parameter scales the filtered projection data based on a change in organ volume for the different motion phases.

9. The method of claim 1, wherein the organ is one of a lung or a heart and the motion is one or more of cardiac or respiratory motion.

10. The method of claim 1, wherein reconstructing the projection data includes reconstructing the projection data using a filtered backprojection reconstruction algorithm.

11. The method of claim 1, further comprising:
determining whether a tissue density for the moving organ varies across different motion phases and generating a signal indicative thereof.

12. The method of claim 11, further comprising:
identifying the moving organ as not healthy if the tissue density does not vary and the moving organ includes tissue of a type that varies in density across the different motion phases.

13. The method of claim 11, further comprising:
identifying the moving organ as healthy if the tissue density varies across the different motion phases.

14. A data compensator, comprising:
a reconstructor, implemented via a hardware processor, that reconstructs motion compensated image data based on a reconstruction algorithm that compensates for tissue density changes in a moving object in projection data.

15. The data compensator of claim 14, further comprising:
a motion vector field supplementor, implemented via the hardware processor, that generates a supplemented motion vector field based on a motion vector field and a parameter indicative of a change in a volume of the moving organ, wherein the reconstruction algorithm is based on the supplemented motion vector field.

16. The data compensator of claim 15, wherein the change in volume corresponds to a change in tissue density of the moving organ.

17. The data compensator of claim 15, wherein the parameter is one of a divergence of the motion vector field or a determinant of a Jacobian of the motion vector field.

18. The data compensator of claim 17, wherein a negative divergence indicates a contraction of the volume, a positive divergence indicates an expansion of the volume and a decrease in tissue density, and a divergence of about zero indicates preservation of the volume and tissue density.

19. The data compensator of claim 15, wherein the parameter scales the motion vector field based on a change in organ volume across the different motion phases.

20. The data compensator of claim 15, further comprising:
a data analyzer, implemented via the hardware processor, that quantifies tissue density in similar tissue for different motion states based on the image data and generates a first signal indicative thereof.

21. The data compensator of claim 20, further comprising: displaying at least one of the image data or the first signal.

22. The data compensator of claim 20, wherein the quantified information is indicative of ventilation of lung tissue.

23. The data compensator of claim 22, wherein absence of a change in tissue density across motion phases indicate a presence of disease.

24. The data compensator of claim 15, further comprising:
a data analyzer, implemented via a hardware processor, that quantifies a difference in tissue density in similar tissue for different motion states based on the image data and generates a second signal indicative thereof.

25. A non-transitory computer readable storage medium containing instructions which, when executed by a computer, cause the computer to perform the act of:
reconstructing projection data and thereby generating image data based on a supplemented motion vector field that compensates for both motion and tissue density changes of a moving organ across different motion phases.

* * * * *